US012153954B2

United States Patent
Liu et al.

(10) Patent No.: US 12,153,954 B2
(45) Date of Patent: Nov. 26, 2024

(54) DYNAMIC PRODUCTION SCHEDULING METHOD AND APPARATUS BASED ON DEEP REINFORCEMENT LEARNING, AND ELECTRONIC DEVICE

(71) Applicant: Beijing University of Posts and Telecommunications, Beijing (CN)

(72) Inventors: Liang Liu, Beijing (CN); Xiaolong Zheng, Beijing (CN); Huadong Ma, Beijing (CN); Zihui Luo, Beijing (CN); Chengling Jiang, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 573 days.

(21) Appl. No.: 17/524,335

(22) Filed: Nov. 11, 2021

(65) Prior Publication Data

US 2022/0179689 A1 Jun. 9, 2022

(30) Foreign Application Priority Data

Dec. 4, 2020 (CN) .......................... 202011406748.3

(51) Int. Cl.
  *G06F 9/46* (2006.01)
  *G06F 9/48* (2006.01)
  *G06N 3/08* (2023.01)

(52) U.S. Cl.
  CPC ............. *G06F 9/4881* (2013.01); *G06N 3/08* (2013.01)

(58) Field of Classification Search
  CPC .................................................. G06F 9/4881
  (Continued)

(56) References Cited

U.S. PATENT DOCUMENTS

| | | | | |
|---|---|---|---|---|
| 8,281,313 B1 * | 10/2012 | Santos | ................. | G06F 9/5038 718/100 |
| 10,089,144 B1 * | 10/2018 | Nagpal | ............... | G06F 16/2455 |

(Continued)

FOREIGN PATENT DOCUMENTS

| CN | 109934332 A | 6/2019 |
|---|---|---|
| CN | 110427006 A | 11/2019 |
| CN | 110580196 A | 12/2019 |

OTHER PUBLICATIONS

Liu, Chang and Tseng, "Actor-Critic Deep Reinforcement Learning for Solving Job Shop Scheduling Problems," in IEEE Access, vol. 8, pp. 71752-71762, 2020, doi: 10.1109/ACCESS.2020.2987820.

(Continued)

*Primary Examiner* — Mehran Kamran
(74) *Attorney, Agent, or Firm* — Burr & Forman LLP

(57) ABSTRACT

The embodiments of the present invention provide a dynamic production scheduling method, apparatus and electronic device based on deep reinforcement learning, which relate to the technical field of Industrial Internet of Things, and can reduce the overall processing time of jobs on the basis of not exceeding the processing capacity of production device. The embodiments of the present invention includes: acquiring static characteristics, dynamic characteristics of each of jobs and system dynamic characteristics, inputting the static characteristics, dynamic characteristics of each of jobs to be scheduled and system dynamic characteristics into a scheduling model to obtain a job execution sequence or batch execution sequence of the jobs in each production stage, wherein, the static characteristics of the job include an amount of tasks and time required for completion, the dynamic characteristics of the job include reception moment, and the system dynamic characteristics include a remaining amount of tasks that can be performed by the device in each production stage. The scheduling model is a (Continued)

model obtained after training a first actor network based on static characteristics and dynamic characteristics of a sample job, system dynamic characteristics, and a first critic network.

14 Claims, 3 Drawing Sheets

(58) Field of Classification Search
USPC .......................................................... 718/102
See application file for complete search history.

(56) References Cited

U.S. PATENT DOCUMENTS

| 11,640,552 | B2* | 5/2023 | Nagai | G06N 20/00 |
| | | | | 706/12 |
| 11,893,480 | B1* | 2/2024 | Riedmiller | G06N 3/045 |
| 2017/0024251 | A1* | 1/2017 | Yi | G06F 9/5083 |
| 2018/0246758 | A1* | 8/2018 | Cardonha | G06Q 10/0631 |
| 2018/0373997 | A1* | 12/2018 | Duan | G06N 3/006 |
| 2019/0121889 | A1* | 4/2019 | Gold | G06T 1/20 |
| 2019/0130285 | A1* | 5/2019 | Snyder | G06Q 30/0641 |
| 2020/0012522 | A1* | 1/2020 | Cardonha | G06F 9/4881 |
| 2020/0034701 | A1* | 1/2020 | Ritter | G06F 9/5005 |
| 2020/0257968 | A1* | 8/2020 | Mitra | H04L 67/51 |
| 2021/0097444 | A1* | 4/2021 | Bansal | G06F 9/546 |
| 2021/0312280 | A1* | 10/2021 | Taitler | G06N 3/08 |
| 2022/0050714 | A1* | 2/2022 | Grimshaw | G06F 9/4856 |
| 2022/0179689 | A1* | 6/2022 | Liu | G06N 3/045 |
| 2023/0055415 | A1* | 2/2023 | Desaulniers | G06N 3/08 |
| 2023/0067605 | A1* | 3/2023 | Liu | G06N 7/01 |
| 2023/0094381 | A1* | 3/2023 | Meghani | G06N 3/092 |
| | | | | 705/7.22 |
| 2023/0096811 | A1* | 3/2023 | Meghani | G06N 3/04 |
| | | | | 718/102 |
| 2024/0129380 | A1* | 4/2024 | Ganju | G06F 11/3062 |

OTHER PUBLICATIONS

First Office Action of Chinese Application No. 202011406748.3 dated Apr. 25, 2022, all pages cited in its entirety.

* cited by examiner

DYNAMIC PRODUCTION SCHEDULING METHOD AND APPARATUS BASED ON DEEP REINFORCEMENT LEARNING, AND ELECTRONIC DEVICE

CROSS-REFERENCE TO RELATED APPLICATION

The present application claims the priority to a Chinese Patent Application No. 202011406748.3, filed with the China National Intellectual Property Administration on Dec. 4, 2020 and entitled "DYNAMIC PRODUCTION SCHEDULING METHOD AND APPARATUS BASED ON DEEP REINFORCEMENT LEARNING, AND ELECTRONIC DEVICE", which is incorporated herein by reference in its entirety.

TECHNICAL FIELD

The present invention relates to the technical field of Industrial Internet of Things, in particular to a dynamic production scheduling method, apparatus based on deep reinforcement learning, and electronic device.

BACKGROUND

The Industrial Internet of Things (IIoT) is a product of the in-depth integration of a new generation of information technology and manufacturing. By realizing the comprehensive interconnection of people, machines and things, it has opened up a new path for industrial production and manufacturing mode.

The unprecedented prosperity of the Industrial Internet of Things has promoted the transformation of traditional industries to intelligent production, enabling the entire production process to be fully controlled and flexible production. At present, the Industrial Internet of Things is in a stage of rapid development. Building an smart factory and promoting smart manufacturing have become one of the main directions for the current industrial transformation and upgrading and high-quality development. In the context of the Industrial Internet of Things, an ideal smart factory needs to fully monitor and schedule the overall production process according to the different needs of users. The production process of a general job includes multiple production stages. Each production stage includes multiple production devices, and one production device can process one or more jobs in parallel. How to allocate a batch of jobs to reduce the overall processing time of jobs on the basis of not exceeding the processing capacity of production device is the goal of smart manufacturing.

In order to achieve this goal, an efficient scheduling method is needed.

SUMMARY

The purpose of the embodiments of the present invention is to provide a dynamic production scheduling method, apparatus and electronic device based on deep reinforcement learning, which can reduce the overall processing time of jobs on the basis of not exceeding the processing capacity of production device. Specifically, the technical solutions are as follows:

In a first aspect, an embodiment of the present application provides a dynamic production scheduling method based on deep reinforcement learning, the method includes:

acquiring static characteristics and dynamic characteristics of each of jobs to be scheduled and system dynamic characteristics, the static characteristics of the job comprise an amount of tasks and time required for completion, the dynamic characteristics of the job comprise reception moment, and the system dynamic characteristics comprise a remaining amount of tasks that can be performed by a device in each production stage;

inputting the static characteristics, dynamic characteristics of each of jobs and the system dynamic characteristics into a scheduling model to obtain a job execution sequence or batch execution sequence of the jobs in each production stage output by the scheduling model; each batch comprises multiple jobs;

wherein the scheduling model is: a model obtained after training a first actor network based on static characteristics and dynamic characteristics of multiple sample jobs, system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

Optionally, the scheduling model includes a job batching submodel and a first sequence determining submodel; inputting the static characteristics, dynamic characteristics of each of jobs and system dynamic characteristics into a scheduling model to obtain a job execution sequence or batch execution sequence of the jobs in each production stage output by the scheduling model, includes:

determining, according to the sequence of each production stage and starting from the first production stage, whether the production stage is a sequence processing stage or a batch processing stage;

inputting, when the production stage is a batch processing stage, the static characteristics and dynamic characteristics of each of jobs and the system dynamic characteristics into the job batching submodel to obtain multiple batches divided for the jobs; inputting the static characteristics and dynamic characteristics of multiple batches of jobs and the system dynamic characteristics into a first sequence determining submodel to obtain a batch execution sequence of multiple batches in the production stage; for each batch, calculating, according to the dynamic characteristics of multiple jobs of the batch and the batch execution sequence, start execution moment and completion execution moment of the jobs of the batch in the production stage, and updating the dynamic characteristics of the jobs of the batch and the system dynamic characteristics;

inputting, when the production stage is a sequence processing stage, the static characteristics and dynamic characteristics of each of jobs and the system dynamic characteristics into the first sequence determining submodel to obtain a job execution sequence of the jobs in the production stage; for each of jobs, calculating, according to the dynamic characteristics of the job and the job execution sequence, start execution moment and completion execution moment of the job in the production stage, and updating the dynamic characteristics of the job and the system dynamic characteristics.

Optionally, the scheduling model is obtained through training in the following steps:

step 1, inputting the static characteristics and dynamic characteristics of multiple sample jobs and the system dynamic characteristics into a first actor network to obtain the job execution sequence or batch execution sequence of the multiple sample jobs in each production stage;

step 2, obtaining, on the basis of the dynamic characteristics of the multiple sample jobs, maximum completion time among completion time corresponding to the multiple sample jobs, and calculating a first cumulative return based on the maximum completion time;

step 3, inputting the static characteristics and dynamic characteristics of the multiple sample jobs, the first cumulative return, and the system dynamic characteristics into a first critic network, to obtain a first return difference value;

step 4, using the first return difference value to adjust network parameters of the first actor network and the first critic network;

step 5, returning, if a current training period is not the last training period, to the execution of the step 1; wherein, steps 1 to 4 are a training period;

step 6, using, if the current training period is the last training period, the first actor network obtained by the current training as the scheduling model.

Optionally, the job batching submodel includes a second sequence determining submodel; the static characteristics and dynamic characteristics of each of jobs, and the system dynamic characteristics are input into the job batch submodel, to obtain multiple batches divided for the jobs, including:

performing initialization processing on the static characteristics of each of jobs;

selecting, based on the static characteristics and dynamic characteristics of each of jobs and the system dynamic characteristics, one job through the second sequence determining submodel, and determining a batch to which the selected job belongs, until batches to which multiple jobs belong is determined and completed.

Optionally, the job batching submodel is obtained through training in the following steps:

step 1, inputting the static characteristics and dynamic characteristics of multiple sample jobs and the system dynamic characteristics into a second actor network to obtain multiple batches divided for multiple samples;

step 2: for each batch, calculating a difference value of the batch based on the difference value between the processing time of jobs in the batch and the difference value between the completion execution moment of each of jobs in the batch in the previous production stage.

step 3, calculating, according to the difference values of multiple batches, a second cumulative return; inputting the static characteristics and dynamic characteristics of the multiple sample jobs, the second cumulative return, and the system dynamic characteristics into a second critic network, to obtain a second return difference value;

step 4, using the second return difference value to adjust network parameters of the second actor network and the second critic network;

step 5, returning, if a current training period is not the last training period, to the execution of the step 1; wherein, steps 1 to 4 are a training period;

step 6, using, if the current training period is the last training period, the second actor network obtained by the current training as the job batch submodel.

Optionally, the method further includes:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

In a second aspect, an embodiment of the present application provides a dynamic production scheduling apparatus based on deep reinforcement learning, the apparatus includes:

a feature acquiring module, configure for acquiring static characteristics and dynamic characteristics of each of jobs to be scheduled and system dynamic characteristics, the static characteristics of the job comprise an amount of tasks and time required for completion, the dynamic characteristics of the job comprise reception moment, and the system dynamic characteristics comprise a remaining amount of tasks that can be performed by a device in each production stage;

a sequence obtaining module, configured for inputting the static characteristics, dynamic characteristics of each of jobs and the system dynamic characteristics into a scheduling model, to obtain a job execution sequence or batch execution sequence of the jobs in each production stage output by the scheduling model; each batch comprises multiple jobs;

wherein the scheduling model is: a model obtained after training a first actor network based on the static characteristics and dynamic characteristics of multiple sample jobs, system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

Optionally, the scheduling model includes a job batching submodel and a first sequence determining submodel; the sequence obtaining model is specifically configured for performing the following steps through the scheduling model:

determining, according to the sequence of each production stage and starting from the first production stage, whether the production stage is a sequence processing stage or a batch processing stage;

inputting, when the production stage is a batch processing stage, the static characteristics and dynamic characteristics of each of jobs and the system dynamic characteristics into the job batching submodel to obtain multiple batches divided for the jobs; inputting the static characteristics and dynamic characteristics of multiple batches of jobs and the system dynamic characteristics into a first sequence determining submodel to obtain a batch execution sequence of multiple batches in the production stage; for each batch, calculating, according to the dynamic characteristics of multiple jobs of the batch and the batch execution sequence, start execution moment and completion execution moment of the jobs of the batch in the production stage, and updating the dynamic characteristics of the jobs of the batch and the system dynamic characteristics;

inputting, when the production stage is a sequence processing stage, the static characteristics and dynamic characteristics of each of jobs and the system dynamic characteristics into the first sequence determining submodel to obtain a job execution sequence of the jobs in the production stage; for each of jobs, calculating, according to the dynamic characteristics of the job and the job execution sequence, start execution moment and completion execution moment of the job in the production stage, and updating the dynamic characteristics of the job and the system dynamic characteristics.

Optionally, the apparatus further includes a first training module, the first training module is configured for performing the following steps:

step 1, inputting the static characteristics and dynamic characteristics of multiple sample jobs and the system dynamic characteristics into a first actor network to obtain the job execution sequence or batch execution sequence of the multiple sample jobs in each production stage;

step 2, obtaining, on the basis of the dynamic characteristics of the multiple sample jobs, maximum completion time among completion time corresponding to the multiple sample jobs, and calculating a first cumulative return based on the maximum completion time;

step 3, inputting the static characteristics and dynamic characteristics of the multiple sample jobs, the first cumulative return, and the system dynamic characteristics into a first critic network, to obtain a first return difference value;

step 4, using the first return difference value to adjust network parameters of the first actor network and the first critic network;

step 5, returning, if a current training period is not the last training period, to the execution of the step 1; wherein, steps 1 to 4 are a training period;

step 6, using, if the current training period is the last training period, the first actor network obtained by the current training as the scheduling model.

Optionally, the job batching submodel includes a second sequence determining submodel; the sequence obtaining model is specifically configured for performing the following steps through the job batch submodel:

performing initialization processing on the static characteristics of each of jobs;

selecting, based on the static characteristics and dynamic characteristics of each of jobs and the system dynamic characteristics, one job through the second sequence determining submodel, and determining a batch to which the selected job belongs, until batches to which multiple jobs belong is determined and completed.

Optionally, the apparatus further includes a second training module, the second training module is configured for performing the following steps:

step 1, inputting the static characteristics and dynamic characteristics of multiple sample jobs and the system dynamic characteristics into a second actor network to obtain multiple batches divided for multiple samples;

step 2: for each batch, calculating a difference value of the batch based on the difference value between the processing time of jobs in the batch and the difference value between the completion execution moment of each of jobs in the batch in the previous production stage.

step 3, calculating, according to the difference values of multiple batches, a second cumulative return; inputting the static characteristics and dynamic characteristics of the multiple sample jobs, the second cumulative return, and the system dynamic characteristics into a second critic network, to obtain a second return difference value;

step 4, using the second return difference value to adjust network parameters of the second actor network and the second critic network;

step 5, returning, if a current training period is not the last training period, to the execution of the step 1; wherein, steps 1 to 4 are a training period;

step 6, using, if the current training period is the last training period, the second actor network obtained by the current training as the job batch submodel.

Optionally, the apparatus further includes: a calculating module, configured for:

calculating a total deviation degree between an initial scheduling scheme and a rescheduling scheme by the following formula, each scheduling scheme includes a job execution sequence or a batch execution sequence of jobs in each production stage;

$$DE = \omega_p PED + \omega_l LED + \omega_m MED + \omega_c CED$$

wherein, DE is the total deviation degree, and $\omega_p$, $\omega_l$, $\omega_m$, and $\omega_c$ are preset weighting coefficients, and $\omega_p + \omega_l + \omega_m + \omega_c = 1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

In a third aspect, an embodiment of the disclosure provides an electronic device comprising a processor, a communications interface, a memory and a communication bus, wherein the processor, the communications interface, and the memory communicate with each other via the communication bus;

the memory is provided for storing a computer program;
the processor is provided for implementing steps of any one of the above dynamic production scheduling method based on deep reinforcement learning when executing the program stored on the memory.

In a fourth aspect, an embodiment of the present application further provides a computer-readable storage medium having computer programs stored thereon which, when executed by a processing machine, cause the processing machine to implement the steps of any one of the above dynamic production scheduling method based on deep reinforcement learning.

In the fifth aspect, an embodiment of the present application further provides a computer program product containing instructions, which when run on a computer, causes the computer to implement the steps of any one of the above dynamic production scheduling method based on deep reinforcement learning.

The production scheduling method, apparatus and electronic device based on deep reinforcement learning provided by the embodiments of the present application schedule each of jobs based on the amount of tasks, the reception moment and time required for completion of the job, as well as the remaining amount of tasks that can be performed by the device in each production stage through the scheduling model. Since the scheduling model is trained during the training process based on the amount of tasks, the reception moment and time required for completion of the job, as well as the remaining amount of tasks that can be performed by the device in each production stage, so that the first actor network can schedule each of jobs based on the processing capacity of the device, avoiding the amount of tasks allocated to the device exceeding the amount of tasks it can execute. Moreover, the first critic network can evaluate output results of the first actor network based on completion time corresponding to each sample job, so that the first actor network can reduce the completion time duration of the job as a training goal, so that the overall processing time of the job of the scheduling scheme output by the scheduling model after training is short.

It should be understood that any product or method for implementing the disclosure does not necessarily require all of the advantages described above.

BRIEF DESCRIPTION OF THE DRAWINGS

In order to explain the technical solutions of embodiments of the disclosure or of the prior art, a simple introduction of the drawings required in the description of the embodiments and of prior art will be given. Obviously, the drawings described below are just those of some embodiments of the disclosure and other embodiments may be obtained by those of ordinary skill in the art without any creative efforts based on these drawings.

DETAILED DESCRIPTION

Figure 1:
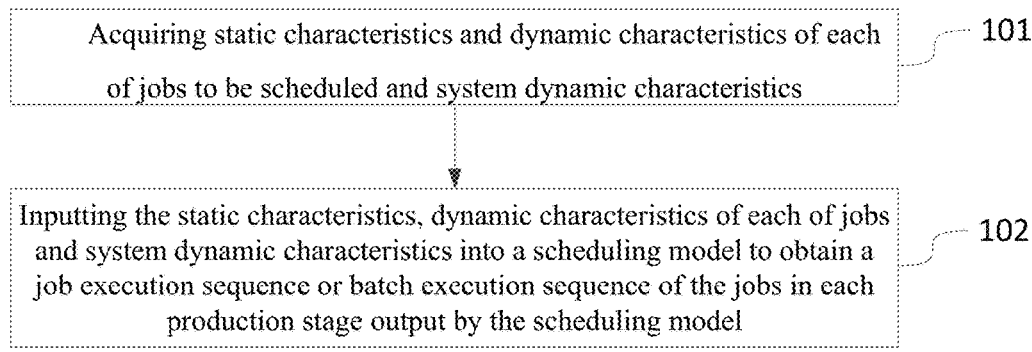
FIG. 1 is a flow diagram of a dynamic production scheduling method based on deep reinforcement learning according to an embodiment of the present application.

The technical solutions of the disclosure will be described in detail with reference to the drawings of embodiments of the disclosure. Obviously, the embodiments described are merely parts of the embodiments of the disclosure, instead of all the embodiments. All other embodiments obtained by those of ordinary skill in the art based on the embodiments of the disclosure without any creative efforts are within the scope of the disclosure.

First, the meaning of symbols involved in the embodiments of the present application will be explained through Table 1.

TABLE 1

| Symbols | Meaning |
| --- | --- |
| N | Number of jobs |
| M | Number of devices in one production stage |
| K | Number of production stages |
| T | Number of training cycles |
| $BPM_m$ | Batch Processing Machine (BPM) m |
| $SPM_m$ | Sequential Processing Machine (SPM) m |
| $pt_{ikm}$ | Processing time of job i on device m in production stage k |
| $pt_{ik}$ | Processing time of job i in production stage k |
| $st_{ikm}$ | Start execution moment of job i on device m in production stage k |
| $st_{ik}$ | Start execution moment of job i in production stage k |
| $ct_{ik}$ | Completion execution moment of job i in production stage k |
| $rt_i$ | Reception moment of job i |
| $d_i$ | Amount of tasks of job i |
| $O_{ik}$ | Processing of job i in production stage k |
| $P_{mb}$ | Processing time duration of batch b on $BPM_m$ |
| $B_m$ | Number of batches executed on $BPM_m$ |
| $CM_m$ | Remaining amount of tasks that can be performed on $BPM_m$ |
| $D_{mb}$ | Difference value between the processing time duration of each of jobs and difference value between the completion execution moment of each of jobs of bitch b on $BPM_m$ |
| $C_{max}$ | Overall completion time duration |

The reception moment of job refers to the time when the system receives the job. For example, the time when the job is generated, and the time when the user sends the specified job. The processing time duration of a job in a production stage is the time difference between the start execution moment and the completion execution moment of the job in the production stage. The completion time duration corresponding to the job is the time difference between the start execution moment in the first production stage and the completion execution moment of the job in the last production stage. The overall completion time duration is the maximum completion time duration among the completion time duration corresponding to the job.

Exemplarily, taking the processing of iron plates as an example, the amount of tasks of job i is the tonnage of iron plates to be processed, $CM_m$ is the remaining tonnage that can be processed by $BPM_m$, and the initial value of $BPM_m$ is a preset rated tonnage.

The following Table 2 describes the meaning corresponding to the values of decision variables involved in the embodiments of the present application.

TABLE 2

| Decision variables | Meaning |
| --- | --- |
| $X_{ikm} = 1$ | Processing of job i on device m in production stage k |
| $X_{ikm} = 0$ | Other |
| $Y_{imb} = 1$ | Processing of job i on $BPM_m$ of batch b |
| $Y_{imb} = 0$ | Other |
| $S_{ikt} = 1$ | Job i starts processing at time t in production stage k |
| $S_{ikt} = 0$ | Other |
| $TO_{ik} = 1$ | Processing of job i in batch processing stage k |
| $TO_{ik} = 0$ | Processing of job i in sequence processing stage k |
| $TM_m = 1$ | Device m is a batch processing machine |
| $TM_m = 0$ | Device m is a sequence processing machine |
| $mask_i = 1$ | Job i has been assigned to a device for processing |
| $mask_i = 0$ | Job i is waiting to be assigned to a device for processing |

In order to reduce the overall completion time duration of production jobs without exceeding the processing capacity of the production machine, an embodiment of the present invention provides a dynamic production scheduling method based on deep reinforcement learning, which is applied to an electronic device, see FIG. 1, the method includes the following steps:

step 101, acquiring static characteristics and dynamic characteristics of each of jobs to be scheduled and system dynamic characteristics.

The static characteristics of each job include an amount of tasks and time required for completion, the dynamic characteristics of each job include reception moment, and the system dynamic characteristics include a remaining amount of tasks that can be performed by a device in each production stage.

In the embodiment of the present invention, the initial value of the remaining amount of tasks that can be executed by the device in each production stage is a preset rated amount of tasks. When the device is not performing a job, the system dynamic characteristics of an input scheduling model are the rated amount of tasks that can be executed by the device.

Optionally, the static characteristics of the job can also include: a length and width of a processed part, etc.

The dynamic characteristics of the job are continuously updated with the determination of the scheduling mode of each production stage. For example, the initial dynamic characteristics of the job include reception moment of the job, and the dynamic characteristics after job update may also include: start execution moment and completion execution moment of the job in multiple production stages.

Step 102, inputting the static characteristics, dynamic characteristics of each of jobs and system dynamic characteristics into a scheduling model to obtain a job execution sequence or batch execution sequence of the jobs in each production stage output by the scheduling model.

Each batch includes multiple jobs, and jobs of the same batch are processed at the same time. The job execution sequence or batch execution sequence of the jobs output by the scheduling model in each production stage can also be referred to as a scheduling scheme. Optionally, the scheduling scheme may also include device numbers corresponding to jobs or batches in each production stage. During processing of the jobs or batches, it is processed on the device corresponding to the device number.

The scheduling model is: a model obtained after training a first actor network based on the static characteristics and dynamic characteristics of multiple sample jobs, system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

It can be understood that the critic network and the actor network form a set of Reinforcement Learning (RL) networks. During the training process, the actor network is configured for selecting actions based on current environment, and the critic network is configured for evaluating a decision of the actor network based on a training target. Evaluation results of the critic network are configured for adjusting network parameters of the critic network and the actor network. After the training is completed, the actor network can be configured for deciding better actions on the training target.

Optionally, both the first critic network and the first actor network may be a deep learning (DL) network, and the critic network and the actor network form a reinforcement learning network. Therefore, the first critic network and the first actor network in the embodiment of the present invention form a deep reinforcement learning (DRL) network.

Reinforcement learning is an important branch of machine learning, which mainly studies how an agent takes actions in the environment to obtain the largest cumulative return. After an agent is trained, it can quickly make correct behaviors for new problems encountered to obtain the largest cumulative return. Reinforcement learning can be successfully applied in manufacturing scenarios.

Deep learning has strong perception ability, but lacks certain decision ability; while reinforcement learning has strong decision ability, but lacks perception ability. Therefore, the deep reinforcement learning adopted in the embodiment of the present invention combines deep learning and reinforcement learning, complements each other's advantages, and provides a solution for complex perceptual decision problem.

The production scheduling method based on deep reinforcement learning provided by the embodiments of the present invention schedule each of jobs based on the amount of tasks, the reception moment and time required for completion of the job, as well as the remaining amount of tasks that can be performed by the device in each production stage through the scheduling model. Since the scheduling model is trained during the training process based on the amount of tasks, the reception moment and time required for completion of the job, as well as the remaining amount of tasks that can be performed by the device in each production stage, so that the first actor network can schedule each of jobs based on the processing capacity of the device, avoiding the amount of tasks allocated to the device exceeding the amount of tasks it can execute. Moreover, the first critic network can evaluate output results of the first actor network based on completion time corresponding to each sample job, so that the first actor network can reduce the completion time duration of the job as a training goal, so that the overall processing time of the job of the scheduling scheme output by the scheduling model after training is shorter.

In the embodiment of the present invention, the above-mentioned scheduling model includes: a job batching submodel and a first sequence determining submodel.

The scheduling model uses the following steps to determine the job execution sequence or batch execution sequence of jobs in each production stage:

step (1), determining, according to the sequence of each production stage and starting from the first production stage, whether the production stage is a sequence processing stage or a batch processing stage.

In the embodiment of the present invention, each production stage is one of a sequence processing stage and a batch processing stage.

Figure 2:
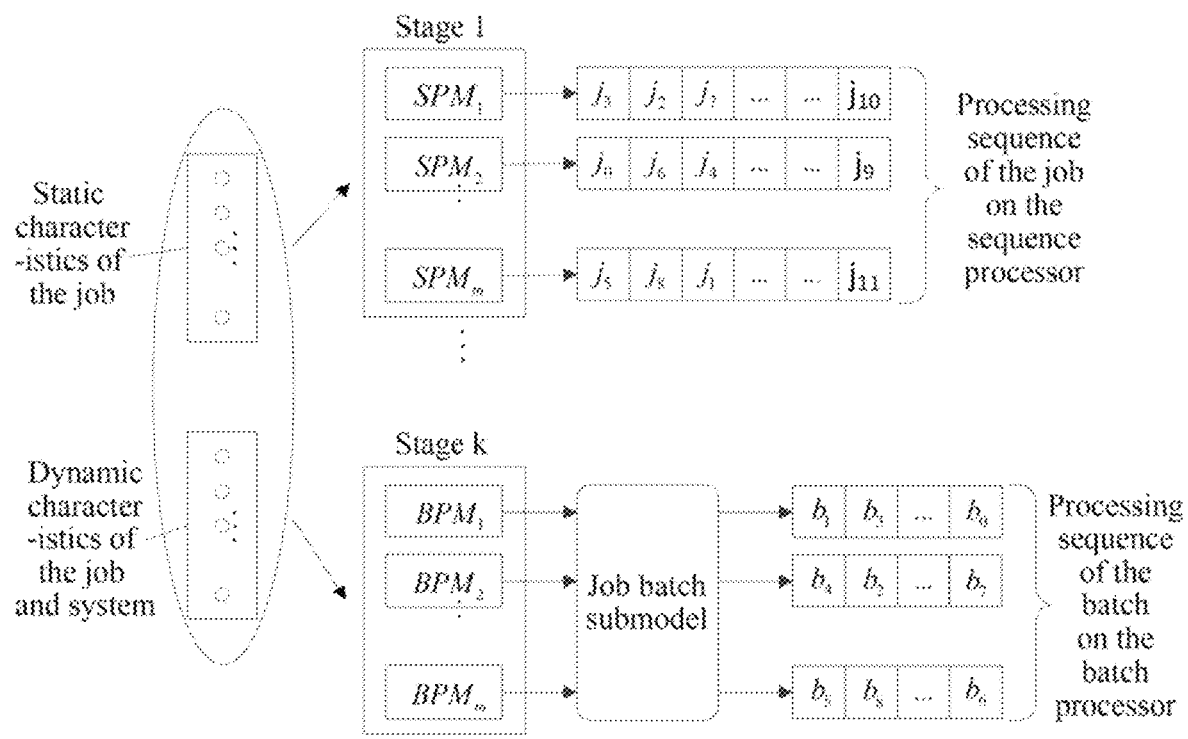
FIG. 2 is a flow diagram of a scheduling model for outputting a scheduling solution according to an embodiment of the present application.

Referring to FIG. 2, the scheduling model determines the processing sequence of each of jobs on each sequence processing machine for each sequence processing stage according to the static characteristics and dynamic characteristics of the job and the system dynamic characteristics. For each batch processing stage, a job batching submodel is used to divide the job into batches, and then the processing sequence of each batch is determined on the batch processing machine.

For example, the processing sequence of each of jobs in the sequence processing machine SPM1 of stage 1 in FIG. 2 is: $j_3, j_2, j_7, \ldots, j_{10}$. The processing sequence of each of jobs on the batch processing machine $BPM_1$ of stage k in FIG. 2 is: $b_1, b_3, \ldots, b_0$.

Step (2), inputting, when the production stage is a batch processing stage, the static characteristics and dynamic characteristics of each of jobs and the system dynamic characteristics into the job batching submodel to obtain multiple batches divided for the jobs. Then, inputting the static characteristics and dynamic characteristics of the jobs and the system dynamic characteristics into a first sequence determining submodel to obtain a batch execution sequence of multiple batches in the production stage. For each batch, calculating, according to the dynamic characteristics of each of jobs of the batch and the batch execution sequence, start execution moment and completion execution moment of jobs of the batch in the production stage, and updating the dynamic characteristics of jobs of the batch and the system dynamic characteristics. Optionally, the first sequence determining submodel may also determine the device number corresponding to each batch. During processing of each batch, it is processed on the device corresponding to the device number.

The job batching submodel is a model obtained after training a second actor network based on the static characteristics and dynamic characteristics of multiple sample jobs, the system dynamic characteristics, and the second critic network. The second critic network is configured for evaluating output results of the second actor network based on differences between the processing time of jobs of the same batch and differences between the completion execution moment of jobs of the same batch.

The first sequence determining submodel is configured for calculating a probability of selecting each job based on the static characteristics and dynamic characteristics of multiple jobs and the system dynamic characteristics, and selecting the job with the highest probability, or calculating a probability of selecting each batch based on the static characteristics and dynamic characteristics of jobs in multiple batches and the system dynamic characteristics, and selecting a batch with the highest probability.

In the embodiment of the present invention, device types included in each production stage are the same, that is, the sequence processing stage includes a sequence processing machine, and the batch processing stage includes a batch processing machine. Therefore, it is possible to determine whether the production stage is a sequence processing stage or a batch processing stage according to the device type included in the production stage.

Optionally, the initial dynamic characteristics of the job do not include the start execution moment and the completion execution moment of the job in each stage, and the updated dynamic characteristics of the job include the start execution moment and the completion execution moment of the job in the stage.

When the device is not processing any jobs, the initial dynamic characteristics of the system are the rated amount of tasks that the device can perform at each stage. After the jobs are assigned to the device, the amount of tasks that the device can perform is reduced, and the system dynamic characteristics are updated as the remaining amount of tasks that the device can perform.

It can be understood that each batch is processed once in one production stage. Therefore, the batch corresponding to the characteristics input into the first sequence determining submodel each time is a batch that has not been selected.

In the embodiment of the present invention, a batch processing stage may include a batch processing machine. In one implementation, the static characteristics and dynamic characteristics of each of jobs and the system dynamic characteristics may be input into the job batching submodel to obtain multiple batches divided for the jobs. Then the static characteristics and dynamic characteristics of the jobs that have not been selected and the system dynamic characteristics are input into the first sequence determining submodel. If the first sequence determining submodel calculates that the probability of each batch is empty and outputs that the probability of selecting each batch is empty, the batch will not be selected this time; if the first sequence determining submodel calculates that the probability of selecting each batch is not empty, and outputs the batch with the highest probability, then the batch with the highest probability is selected this time until each of batches are all selected, or until the number of times of batches selected by the first sequence determining submodel reaches a first preset number of times. And the dynamic characteristics of the job and the system dynamic characteristics are updated. Optionally, the first preset number of times=2×the number of devices in the current production stage×the number of batches in the current production stage.

In the case that one batch processing stage includes one batch processing machine, the sequence in which each of batches is selected is the processing sequence of each of batches on the batch processing machine in the production stage, that is, the batch execution sequence.

In the embodiment of the present invention, a batch processing production stage may include multiple batch processing machines. In another implementation, the static characteristics and dynamic characteristics of each of jobs and the system dynamic characteristics may be input into the job batching submodel to obtain multiple batches divided for the jobs. Then recycle execution in a sequence of the batch processing machine: for one batch processing machine, the static characteristics and dynamic characteristics of the jobs that have not been selected and the system dynamic characteristics are input into the first sequence determining submodel. If the first sequence determining submodel outputs that the probability of selecting the batch that has not been selected is empty, the batch will not be selected this time; if the first sequence determining submodel calculates that the probability of selecting each batch is not empty, and outputs the batch with the highest probability, then the batch with the highest probability is selected this time until each of batches are all selected, or until the number of times of batches selected by the first sequence determining submodel reaches a first preset number of times. And the dynamic characteristics of the job and the system dynamic characteristics are updated.

In the case that one batch processing stage includes multiple batch processing machines, the batch sequence selected for each batch processing machine is the processing sequence of the selected batch on the batch processing machine, that is, the batch execution sequence includes the processing sequence of each batch on one batch processing machine.

Step (3), inputting, when the production stage is a sequence processing stage, the static characteristics and dynamic characteristics of each of jobs and the system dynamic characteristics into the first sequence determining submodel to obtain the job execution sequence for the jobs in the production stage. For each job, calculating, according to the dynamic characteristics of the job and the job execution sequence, start execution moment and completion execution moment of the job in the production stage, and updating the dynamic characteristics of the job and the system dynamic characteristics. Optionally, the first sequence determining submodel may also determine the device number corresponding to each of jobs. During processing of the jobs, it is processed on the device corresponding to the device number.

In the embodiment of the present invention, each job is processed once in one production stage. Therefore, the job corresponding to the characteristics input into the first sequence determining submodel each time is a job that has not been selected.

In the embodiment of the present invention, a sequence processing stage may include a sequence processing machine. In one implementation, the static characteristics and dynamic characteristics of each of jobs that have not been selected and the system dynamic characteristics are input into the first sequence determining submodel. If the first sequence determining submodel outputs that the probability of selecting each job is empty, then the job is not selected this time; if the first sequence determining submodel calculates that the probability of selecting each job is not empty, and outputs the job with the highest probability, then the job with the highest probability is selected this time until each of jobs are all selected, or until the number of times of jobs selected by the first sequence determining submodel reaches a second preset number of times. Optionally, the second preset number of times=2×the number of devices in the current production stage×the number of jobs in the current production stage.

In the case that one sequence processing stage includes one sequence processing machine, the sequence in which each of jobs is selected is the processing sequence of each of jobs on the sequence processing machine in the production stage, that is, the job execution sequence.

In the embodiment of the present invention, one sequence processing production stage may include multiple sequence processing machines, in another implementation, it can be executed circularly according to the sequence of each of the sequence processing machines: for one sequence processing machine, the static characteristics and dynamic characteristics of each of jobs that have not been selected and the system dynamic characteristics are input into the first sequence determining submodel. If the first sequence determining submodel outputs that the probability of selecting each job is empty, then the job is not selected this time; if the first sequence determining submodel calculates that the probability of selecting each job is not empty, and outputs the job with the highest probability, then the job with the highest probability is selected this time until each of jobs are all selected, or until the number of times of jobs selected by the first sequence determining submodel reaches a second preset number of times.

In the case that one sequence processing stage includes multiple sequence processing machines, the job sequence selected for each sequence processing machine is the processing sequence of the selected job on the sequence processing machine, that is, the job execution sequence includes the processing sequence of each job on one sequence processing machine.

For example, one sequence processing stage includes sequence processing machine 1 and sequence processing machine 2. When determining the processing sequence of job A, job B, and job C, for the sequence processing machine 1, the static characteristics and dynamic characteristics of these three jobs and the system dynamic characteristics are input into a first sequence determining submodel, and the first sequence determining submodel outputs job A; then for the sequence processing machine 2, the static characteristics and dynamic characteristics of job B and job C and the system dynamic characteristics are input into the first sequence determining submodel, and the first sequence determining submodel outputs job C. Then for the sequence processing machine 1, the static characteristics and dynamic characteristics of job B and the system dynamic characteristics are input into the first sequence determining submodel, and output of the first sequence determining submodel is empty, and no job is selected this time. Then for the sequence processing machine 2, the static characteristics and dynamic characteristics of job B and the system dynamic characteristics are input into the first sequence determining submodel, and the first sequence determining submodel outputs job B. Finally, the job execution sequence on the sequence processing machine 1 is job A, and the job execution sequence on the sequence processing machine B is: job C, job B.

In the embodiment of the present invention, the above-mentioned scheduling model can be obtained through training in the following steps:

step 1, inputting the static characteristics and dynamic characteristics of multiple sample jobs and the system dynamic characteristics into a first actor network to obtain the job execution sequence or batch execution sequence of the multiple sample jobs in each production stage.

Optionally, the first actor network may also determine the device number corresponding to the sample job.

step 2, obtaining, on the basis of the dynamic characteristics of the multiple sample jobs, maximum completion time among completion time corresponding to the multiple sample jobs, and calculating a cumulative return based on the maximum completion time.

Optionally, after step 1, the dynamic characteristics of each sample job include the start execution moment and the completion execution moment of the job in each production stage. The time difference between the start execution moment in the first production stage and the completion execution moment in the last production stage of the job is calculated as the completion time of the job, the overall completion time of the job $C_{max}$ is determined as the maximum completion time, and the first cumulative return=$1/C_{max}$.

In the embodiment of the present invention, the shorter the completion time of each of jobs, the greater the cumulative return obtained.

step 3, inputting the static characteristics and dynamic characteristics of the multiple sample jobs, the first cumulative return, and the system dynamic characteristics into a first critic network, to obtain a first return difference value.

In the embodiment of the present invention, the first critic network calculates the expected cumulative return of a current state according to input data, and then determines a first return difference value based on the difference value between the actual cumulative return and the expected cumulative return.

The first return difference value is calculated by formula (1):

$$\Delta \leftarrow \Sigma(R+\gamma V(S')-V(S)) \qquad (1)$$

wherein, δ is the first return difference value, R is the first cumulative return, γ is the return factor, V (S') is the expected cumulative return, and V(S) is the actual cumulative return. γ is a parameter that can be learned during model training.

Step 4, using the first return difference value to adjust network parameters of the first actor network and the first critic network.

The model parameters of the first actor network are adjusted by formula (2):

$$\theta' \leftarrow \theta + \alpha \nabla_\theta \log \pi_\theta(s,a)\delta \qquad (2)$$

wherein, θ' is the updated model parameter of the first actor network, θ is the model parameter before the first actor network is updated, α is a first adjustment factor, $\nabla_\theta$ is a preset gradient, $\pi_\theta(s,a)$ is a strategy function, δ is the first return difference value, α is a parameter that can be learned during model training.

Exemplarily, $\pi_\theta(s,a)$ may be a logistic regression (softmax) strategy function.

The model parameters of the first critic network are adjusted by formula (3):

$$w' \leftarrow w + \beta \delta \emptyset(s,a) \qquad (3)$$

wherein, w' is the updated model parameter of the first critic network, w is the model parameter before the first critic network is updated, β is a second adjustment factor, δ is a first return difference value, Ø(s,a) is a feature vector, β is a parameter that can be learned during model training. The feature vector is a vector of the dynamic characteristics and static characteristics of the input job and the system dynamic characteristics.

Step 5, returning, if the current training period is not the last training period, to step 1, wherein, step 1 to step 4 is one training period.

Step 6, using, if the current training period is the last training period, the first actor network obtained by the current training as the scheduling model.

Since the embodiment of the present invention can adjust the model parameters of the first actor network and the first critic network according to the completion time of the job, the training process will make the completion time of the scheduling scheme job output by the first actor network closer to the shortest completion time, this enables the scheduling scheme job output by the first actor network after the training to be completed in the shortest time. In this case, the idle time of the device is the smallest, which shortens the production period time, improves the utilization rate of the device, and also improves the production efficiency.

In the embodiment of the present invention, the job batching submodel of the above-mentioned scheduling model includes: a second sequence determining submodel.

The steps of dividing multiple jobs into batches by the job batching submodel include: initializing the static characteristics of the multiple jobs, and then selecting, based on the static characteristics and dynamic characteristics of the multiple jobs, one job through the second sequence determining submodel, and determining a batch to which the selected job belongs, until batches to which multiple jobs belong is determined to be completed.

The second sequence determining submodel is configured for calculating a probability of selecting each job based on the static characteristics and dynamic characteristics of multiple jobs and the system dynamic characteristics, and selecting the job with the highest probability.

Optionally, the initialization can be normalization, and the static characteristics of the job are normalized using formula (4):

$$\hat{x} = \frac{x - x_{min}}{x_{max} - x_{min}} \qquad (4)$$

Wherein, $\hat{x}$ are the static characteristics after job normalization, x are the static characteristics before job normalization, $x_{min}$ are the static characteristics with the smallest value in multiple jobs, and $x_{max}$ are the static characteristics with the largest value in multiple jobs.

In one implementation, if the capacity of the current batch is full, the job selected by a second sequence model is divided into a new batch. Optionally, the capacity of the current batch is full may mean that the remaining amount of tasks that can be performed by the device processing the current batch is less than a preset threshold.

Each time a second actor network selects one job, the dynamic characteristics of the job and the system dynamic characteristics will be updated, and the second actor network selects the next unselected job based on the updated characteristics, until multiple jobs are selected.

The embodiment of the present invention can determine which jobs can be combined into one batch according to the static characteristics of the jobs, for example, the jobs whose length and thickness are within a certain range are combined into one batch. In addition, the embodiment of the present invention can also determine the batch of jobs according to the system dynamic characteristics, which can improve the utilization rate of each device, and make the task amount of the assigned job of the device not exceed the task amount that the device can perform.

Figure 3:
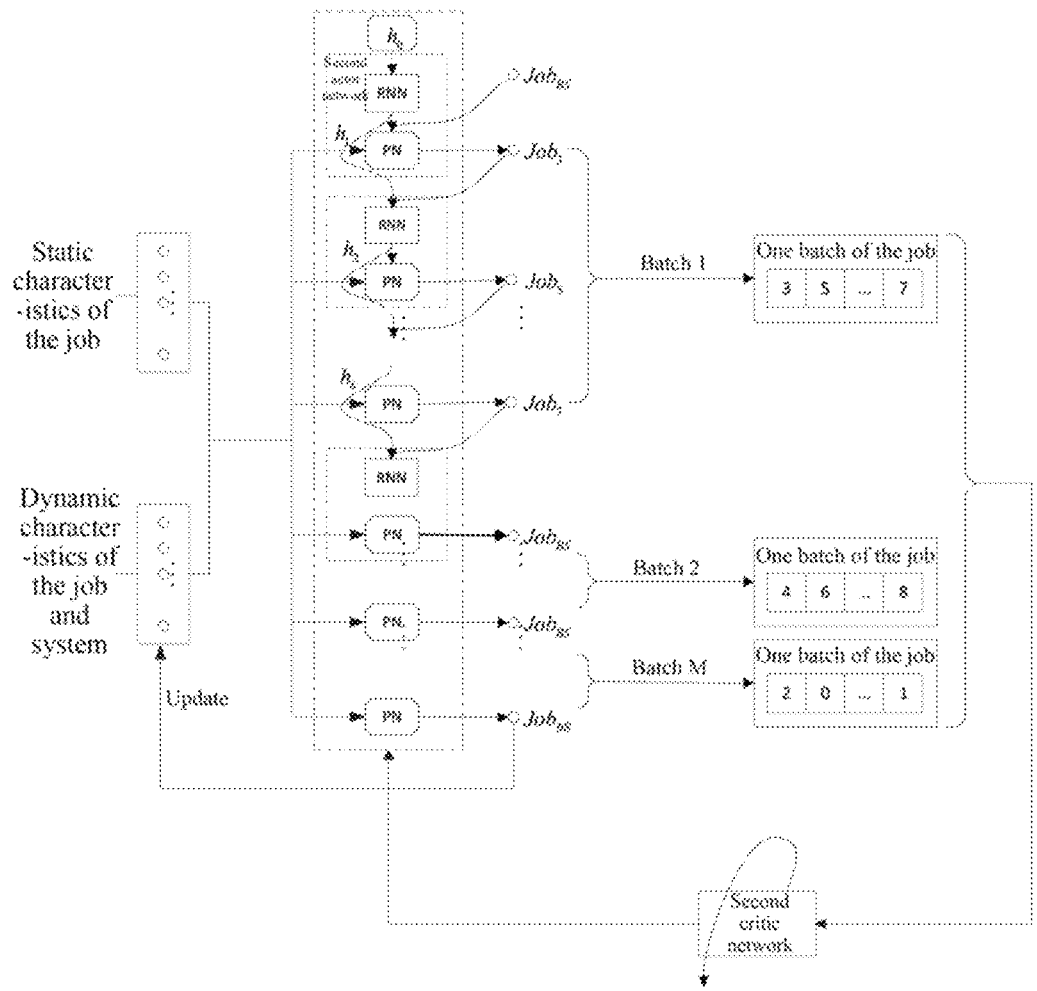
FIG. 3 is a flow diagram of dividing job batches by a job batching submodel according to an embodiment of the present application.

Referring to FIG. 3, which is flow diagram of dividing job batches by a job batching submodel. The second actor network in the job batching submodel includes a recurrent neural network (RNN) and a pointer network (PN), wherein, each Job represents one job, for example, $Job_3$ represents job 3 and $Job_5$ represents job 5. $Job_{BS}$ represents an empty job, the static characteristics and dynamic characteristics of the empty job are both 0. When dividing a new batch, first select an empty job $Job_{BS}$ as a separator between the new batch and the previous batch.

$h_t$ shown in FIG. 3 represents a hidden state of RNN. Each time a job is selected, $h_t$ is updated once. For example, $h_0$ represents an initial hidden state of RNN; $h_1$ represents the state that after a job is selected, the hidden state of the RNN is updated from $h_0$; $h_2$ represents the state that after a job is selected, the hidden state of the RNN is updated from $h_1$, and so on.

Optionally, referring to FIG. 3, the job batching submodel in the above scheduling model can be obtained through training in the following steps:

step 1, inputting the static characteristics and dynamic characteristics of multiple sample jobs and the system dynamic characteristics into a second actor network to obtain multiple batches divided for multiple samples.

In one embodiment, referring to FIG. 3, the RNN of the second actor network updates the current hidden state, and the PN network selects a job to join the current batch based on the current hidden state, the static characteristics and dynamic characteristics of the jobs that have not been selected, and the system dynamic characteristics, or when it is determined that the capacity of the current batch is full, the PN network selects a job to join the next batch until each job is selected. For example, in FIG. 3, $Job_3$, $Job_5$, ..., $Job_7$ are divided into batch 1, $Job_4$, $Job_6$, ..., $Job_8$ are divided into batch 2, $Job_2$, $Job_0$, ..., $Job_1$ are divided into bath M.

Wherein, each of RNNs in FIG. 3 represents the same network, and each of PNs represents the same network. The display of multiple RNNs and PNs is to reflect the change of the hidden state $h_t$ of the RNN after each selection job, and to reflect that the jobs selected by the PN each time are different.

In the embodiment of the present invention, in the process of dividing batches by the second actor network, each time a batch is determined, the dynamic characteristics of the jobs in the batch and the system dynamic characteristics can be updated. Refer to FIG. 3, the batch M is taken as an example in FIG. 3, the arrows pointing from $Job_{BS}$ to the dynamic characteristics of the job and the system represent: updating, according to the batch M divided by the jobs, the dynamic characteristics of the job in the batch M and the system dynamic characteristics. After other batches are determined, the dynamic characteristics and system dynamic characteristics of the jobs in the other batches can also be updated, which is not shown in FIG. 3.

Step 2: for each batch, calculating a difference value of the batch based on the difference value between the processing time of jobs in the batch and the difference value between the completion execution moment of each of jobs in the batch in the previous production stage.

In one implementation, the difference value of each batch is calculated using formula (5):

$$D_{mb} = \sum_{j \neq i}^{N} \sum_{i=1}^{N} \sqrt{(pt_{ik} - pt_{jk})^2 + (ct_{i(k-1)} - ct_{j(k-1)})^2} \tag{5}$$

wherein, $D_{mb}$ is the difference value of one batch, N is the number of jobs in the batch, $pt_{ik}$ is the processing time of job i in production stage k, $pt_{jk}$ is the processing time of job j in production stage k, $ct_{i(k-1)}$ is the completion execution moment of job i in production stage (k−1), and $ct_{j(k-1)}$ is the completion execution moment of job j in the production stage (k−1).

Step 3, calculating, according to the difference values of multiple batches, a second cumulative return; inputting the static characteristics and dynamic characteristics of the multiple sample jobs, the second cumulative return, and the system dynamic characteristics into a second critic network, to obtain a second return difference value.

In the embodiment of the present invention, the smaller the difference between jobs of the same batch, the smaller the difference value of the batch, and the larger the second cumulative return. Optionally, the second cumulative return is: 1/the largest difference value among the difference values of multiple batches.

In one implementation, the second critic network calculates the expected cumulative return of a current state according to a value function based on the input data, and then determines a second return difference value based on the difference value between the actual cumulative return and the expected cumulative return.

The method of calculating the difference value of the second return is the same as the method of calculating the difference value of the first return, this can refer to the method of calculating the first return value, and which will not be repeated here. When calculating the second return difference value, R is the second cumulative return.

Step 4, using the second return difference value to adjust network parameters of the second actor network and the second critic network.

The curved arrow on the second critic network in FIG. 3 indicates that the network parameters of the second critic network are adjusted by using the second return difference value. The arrow pointing from the second critic network to a dashed box in FIG. 3 indicates that the second return difference value is used to adjust the network parameters of the second actor network.

The method of adjusting the network parameters of the second actor network and the second critic network is the same as the method of adjusting the network parameters of the first actor network and the second critic network, this can refer to the method of adjusting the network parameters of the first actor network and the second critic network, and which will not be repeated here.

Step 5, returning, if the current training period is not the last training period, to step 1, wherein, step 1 to step 4 is one training period.

Step 6, using, if the current training period is the last training period, the second actor network obtained by the current training as the job batch submodel.

Since the embodiment of the present invention can adjust model parameters of the second actor network and the second critic network according to the difference between the jobs of the same batch, the training process will make the difference between the jobs of the same batch in the batches divided by the second actor network to be reduced, so that the difference between the jobs within the batches divided by the second actor network after training is minimized, thereby improving the production efficiency.

In one embodiment of the present invention, for a batch processing stage, the processing time $P_{mb}$ of batch b on $BPM_m$ is: the longest time required for completion among the time $pt_{ik}$ required for completion of the batch of jobs.

The completion execution moment $ct_{bk}$ of batch b in production stage k is: the latest completion execution moment $ct_{i(k-1)}$ of jobs of batch b in the previous production stage (k−1)+the processing time $P_{mb}$ of batch b in production stage k.

Start execution moment of batch b in production stage k is $st_{bk}=ct_{bk}-P_{mb}$. The start execution moment $st_{ik}$ of the jobs of the same batch b in the production stage k are all $st_{bk}$, and the completion execution moment $ct_{ik}$ of the jobs of the same batch b in the production stage k are all $ct_{bk}$.

In one embodiment of the present invention, for a sequence processing stage, in accordance with the execution sequence of the jobs, the completion execution moment of the first job $ct_{ik}$=the completion execution moment of the job in the previous processing stage $ct_{i(k-1)}$+the time duration $pt_{ik}$ required for the completion of the job. The completion execution moment of jobs other than the first job $ct_{ik}$=the completion execution moment of the previous job of the job $ct_{(i-1)k}$+the time duration required for the completion of the job $pt_{ik}$.

The start execution moment of the job in the sequence processing stage $st_{ik}=ct_{ik}-pt_{ik}$.

Figure 4:
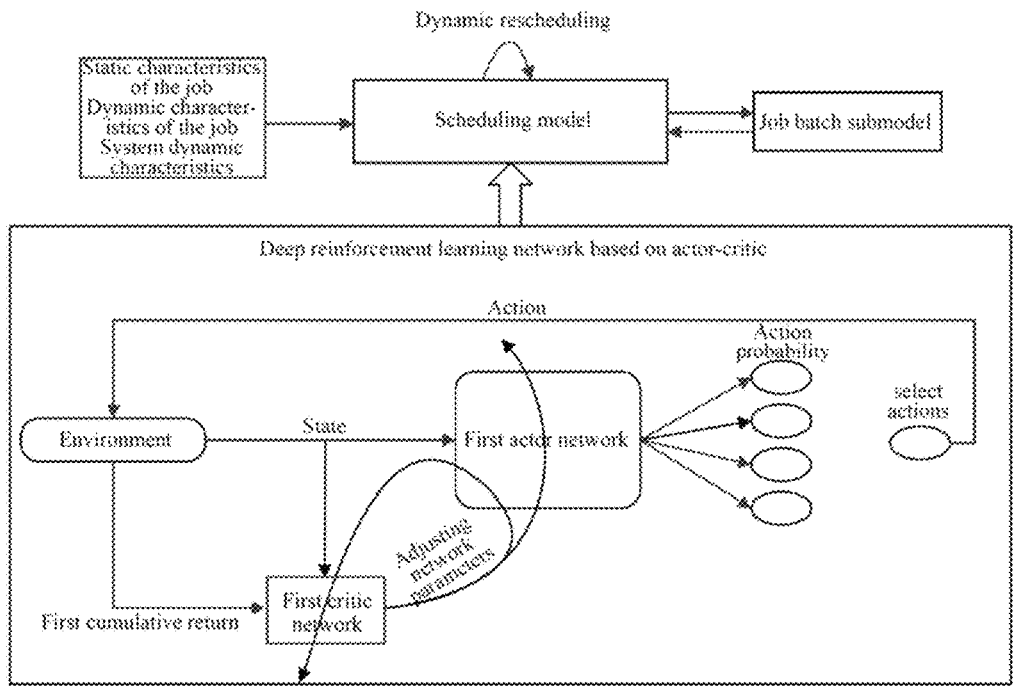
FIG. 4 is a flow diagram of a scheduling model for determining a scheduling solution according to an embodiment of the present application.

The method provided by the embodiment of the present invention can be applied to Hybrid Flow Shop Scheduling Problem with Batch Processing Machines (BPM-HFSP). The processing process of the scheduling model is shown in FIG. 4. The solid arrow in FIG. 4 represents the data transmission direction, and the box below the hollow arrow represents the scheduling process of the scheduling model, wherein, the scheduling model is a deep reinforcement learning network based on actor-critic. Referring to FIG. 4, the static characteristics and dynamic characteristics of the job and the system dynamic characteristics are input into the scheduling model. The first actor network of the scheduling model calculates probability of each action based on the job batching submodel according to the current state of the environment, and then selects the action with the highest probability. Wherein, the current state of the environment refers to the static characteristics of the job, the current dynamic characteristics of the job, and the current system dynamic characteristics, and the action probability refers to the probability of the job or batch being selected. After the action is selected, the current state of the environment changes. The first critic network calculates the first return difference value based on the current state of the environment and the first cumulative return, and adjusts the network parameters of the first critic network and the first actor network based on the first return difference value until the last training period is completed, the first actor network obtained by the current training is taken as the scheduling model. Wherein, the curved arrow pointing from the first critic network to the first actor network in FIG. 4 indicates that the network parameters of the first actor network are adjusted based on the first return difference value. Wherein, the curved arrow pointing from the first critic network to the first critic network in FIG. 4 indicates that the network parameters of the first critic network are adjusted based on the first return difference value.

The BPM-HFSSP applied in the embodiment of the present invention is composed of K production stages, and each production stage includes M parallel processing machines (SPM) or batch processing machines (BPM). There are N jobs that need to go through these K production stages respectively. The production device in the batch processing stage is a batch processing machine. The batch processing stage needs to combine multiple jobs into multiple batches according to the constraints such as the capacity of batch processing machine, and then execute on the batch processing machine in batches. One batch processing machine processes one batch of jobs at a time. The production devices of the sequence processing stage are all sequence processing machines, and the sequence processing machine processes one job at a time.

It can be seen from the above technical solutions of the embodiments of the present invention that the goal of the dynamic production scheduling method based on deep reinforcement learning provided by the embodiments of the present invention is to minimize the overall completion time $C_{max}$, and the scheduling of jobs needs to meet the following constraints:

$$st_i \geq rt_i, \forall i \tag{6}$$

$$pt_{ik} = \begin{cases} \sum_{m=1}^{M} X_{ikm} pt_{ikm}, \forall i, k, TO_{ik} = 0 \\ \sum_{m=1}^{M} \sum_{b=1}^{B_m} Y_{imb} P_{mb}, \forall i, k, TO_{ik} = 1 \end{cases} \tag{7}$$

$$ct_{ik} = st_{ik} + pt_{ik}, \forall i, k \tag{8}$$

$$st_{i(k+1)} \geq ct_{ik}, \forall i, k = 1, 2, \ldots, K-1 \tag{9}$$

$$\sum_{t=1}^{T} S_{ikt} = 1, \forall i, k \tag{10}$$

$$\sum_{m=1}^{M} X_{ikm} = 1, \forall i, k \tag{11}$$

$$S_{ikt} X_{ikm} \sum_{j=1}^{N} \sum_{t=st_{ik}}^{ct_{ik}} S_{jkt} X_{jkm} = 0, \forall i, j, k, t, m, i \neq j, TM_m = 0 \tag{12}$$

$$\sum_{m=1}^{M} \sum_{b=1}^{B_m} Y_{imb} = 1, \forall i, TO_{ik} = 1 \tag{13}$$

$$\sum_{n=1}^{N} Y_{imb} d_i \leq CM_m, \forall m, b, TM_m = 1 \tag{14}$$

$$P_{mb} \geq Y_{imb} pt_{ikm}, \forall i, k, m, b, TM_m = 1 \tag{15}$$

$$Y_{imb} st_{ik} = Y_{jmb} st_{jk}, \forall i, k, m, b, TO_{ik} = 1, TO_{jk} = 1 \tag{16}$$

$$Y_{imb} ct_{ik} = Y_{jmb} ct_{jk}, \forall i, k, m, b, TO_{ik} = 1, TO_{jk} = 1 \tag{17}$$

Wherein, formula (6) indicates that the job can only be processed after it is received. Formula (7) indicates that the processing time duration of the job in the sequence processing stage is the total processing time duration of the job on each sequence processing machine, and the processing time duration of the job in the batch processing stage is the processing time of the batch to which the job belongs on $BPM_m$. Formula (8) indicates that the completion execution moment of a job in a production stage is the sum of the start execution moment of the job in the production stage and the processing time duration of the job in the production stage. Formula (9) indicates that the job can only start processing in the next stage after the previous stage is completed. Formula (10) indicates that the job can only be processed once in each production stage. Formula (11) indicates that the job can only be processed by one machine in each process. Formula (12) indicates that the sequence processing machine can only process one job at a time. Formula (13) indicates that the batch processing machine can only process one batch of jobs at a time. Formula (14) indicates that the total task volume of multiple batches of jobs in the batch process machine cannot exceed the remaining amount of tasks that the batch processing machine can execute. Formula (15) indicates that the processing time of one batch is the maximum processing time of the jobs constituting the batch. Formula (16) indicates that the jobs in the same batch have the same start execution moment. Formula (17) indicates that the jobs in the same batch have the same execution completion time.

The technical solution of the embodiment of the present invention can be applied to the problem of a hybrid flow shop with batch processing. Both the batch processing stage and the sequence processing stage can be located in any production stage in the entire production process, which is more suitable for the actual production process.

In the actual production process, there may be uncertain factors such as device failure, processing task delay, emergency order insertion or random receiving jobs, etc. At this time, the originally formulated scheduling scheme will no longer be applicable to the current state. The difference between the new scheduling scheme and the original scheduling scheme should be as small as possible to ensure the continuity of workshop production and reduce the overhead of rescheduling. For example, the overhead of rescheduling includes: additional device preparation time and job switching time, etc. due to the switch of production machines and the change of job sequence.

As shown in FIG. 4, the present invention can input the static characteristics and dynamic characteristics of the new job and the system dynamic characteristics into the scheduling model when determining the rescheduling scheme to obtain a new scheduling scheme. The curved arrow above the scheduling model in FIG. 4 indicates that the job is dynamically rescheduled to obtain a new scheduling scheme, that is, a rescheduling scheme. Wherein, the dynamic characteristics of the job and the system dynamic characteristics are both initial values.

In the embodiment of the present invention, the total deviation between the initial scheduling scheme and the rescheduling scheme can be calculated by the following formula (18), each scheduling scheme includes the job execution sequence or batch execution sequence of jobs in each production stage; in the embodiment of the present invention, the smaller the total deviation, the more similar the initial scheduling scheme and the rescheduling scheme, and the smaller the overhead of rescheduling; the greater the total deviation, the more dissimilar the initial scheduling scheme from the rescheduling scheme, and the greater the overhead of rescheduling.

$$DE = \omega_p PED + \omega_l LED + \omega_m MED + \omega_c CED \quad (18)$$

wherein, DE is the total deviation degree, and $\omega_p$, $\omega_l$, $\omega_m$, and $\omega_c$ are preset weighting coefficients, and $\omega_p + \omega_l + \omega_m + \omega_c = 1$, process deviation (PED) represents a sum of the differences for the jobs which each is a difference between the start execution moment of a job in the initial scheduling scheme and the start execution moment of the same job in the rescheduling scheme in each production stage, load deviation (LED) represents a sum of the differences for stages which each is a difference between a total duration of the execution of the jobs in the initial scheduling scheme and a total duration of the execution of the jobs in the rescheduling scheme in a same stage, machine deviation (MED) represents whether the same job in the initial scheduling scheme and the rescheduling scheme is executed on the same device in the same production stage, and deviation of total processing time (CED) represents a difference value between the overall processing time duration of the jobs of the initial scheduling scheme and the rescheduling scheme.

Where, $$PED = \sum_{k=1}^{K} \sum_{i=1}^{N} |st_{ik} - st'_{ik}| \quad (19)$$

K is the number of production stages, N is the number of jobs, $st_{ik}$ is the start execution moment of job i in production stage k in the initial scheduling scheme, and $st'_{ik}$ is the start execution moment of job i in production stage k in the rescheduling scheme.

$$LED = \sum_{k=1}^{K} \sum_{m=1}^{M} |L_{km} - L'_{km}| \quad (20)$$

K is the number of production stages, M is the number of devices in a production stage, $L_{km}$ is the total time to execute jobs on device m in production stage k in the initial scheduling scheme, and $L'_{km}$ is the total time duration of executing jobs on device m in production stage K in the rescheduling scheme.

$$MED = \sum_{k=1}^{K} \sum_{i=1}^{N} y_{ik} \quad (21)$$

K is the number of production stages, N is the number of jobs, $y\_y_{ik}=0$ indicates that job i in the initial scheduling scheme and the rescheduling scheme is executed on the same device in the production stage k, $y_{ik}=1$ indicates that job i in the initial scheduling scheme and the rescheduling scheme is not executed on the same device in the production stage k.

$$CED = C'_{max} - C_{max} \quad (22)$$

$C'_{max}$ is the overall completion time duration of the rescheduling scheme, $C_{max}$ is the overall completion time of the initial scheduling scheme.

The embodiment of the present invention calculates the total deviation DE based on the process deviation PED, load deviation LED, machine deviation MED and total processing time deviation CED, so that the calculated total deviation DE can reflect the difference between the rescheduling scheme and the initial scheduling scheme in many aspects.

In addition, the rescheduling scheme obtained by the embodiment of the present invention can complete job scheduling with a smaller overall completion time, and at the same time reduce the switching time overhead of device and workpieces. The embodiment of the present invention is applicable to BPM-HFSP with different numbers of jobs and production devices.

At present, the scheduling methods in most industrial scenarios only consider two production stages, and the number of devices in each production stage is fixed, and it is provided that the batch processing machine must be located in a fixed production stage. In addition, the existing scheduling method does not consider dynamic factors such as machine failure, emergency order insertion, etc. when scheduling jobs.

In the embodiment of the present invention, each production stage can be a sequence execution stage or a batch processing stage, and when the number of devices in the production stage changes, the scheduling model can be retrained according to the updated number of devices, and the rescheduling scheme is generated based on the trained scheduling model. Similarly, the embodiment of the present invention may also retrain the scheduling model based on the static characteristics and dynamic characteristics of the job and the system dynamic characteristics after considering dynamic factors, and generate a rescheduling scheme based on the trained scheduling model.

Wherein, in the model training process, the total deviation between the rescheduling scheme and the initial scheduling scheme can be calculated based on formula (18), the first cumulative return is calculated based on the total deviation, and the scheduling model is trained based on the first cumulative return, so that the total deviation between the rescheduling scheme output by the trained scheduling model and the initial scheduling scheme is smaller, so as to reduce the overhead of rescheduling.

Figure 5:
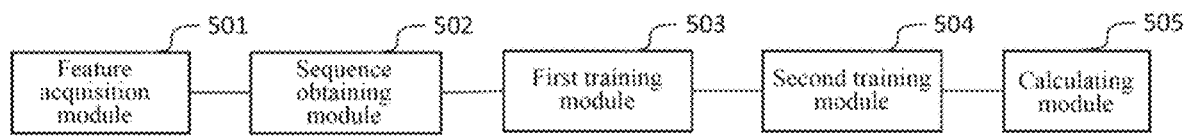
FIG. 5 is a schematic structural diagram of a dynamic production scheduling apparatus based on deep reinforcement learning according to an embodiment of the present application.

Corresponding to the above-mentioned method embodiment, the embodiment of the present invention provides a dynamic production scheduling apparatus based on deep reinforcement learning. Referring to FIG. 5, the apparatus includes: a feature acquisition module 501 and a sequence obtaining module 502;
- a feature acquiring module 501, configure for acquiring static characteristics and dynamic characteristics of each of jobs to be scheduled and system dynamic characteristics. The static characteristics of the job include an amount of tasks and time required for completion, the dynamic characteristics of the job include reception moment, and the system dynamic characteristics include a remaining amount of tasks that can be performed by the device in each production stage;
- a sequence obtaining module 502, configured for inputting the static characteristics, dynamic characteristics of each of jobs and system dynamic characteristics into a scheduling model, and obtaining job execution sequence or batch execution sequence of jobs in each production stage output by the scheduling model; each batch includes multiple jobs;
- wherein the scheduling model is: a model obtained after training a first actor network based on the static characteristics and dynamic characteristics of multiple sample jobs, the system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

Optionally, the scheduling model includes a job batching submodel and a first sequence determining submodel; the sequence obtaining model 502 is specifically configured for performing the following steps through the scheduling model:
- determining, according to the sequence of each production stage and starting from the first production stage, whether the production stage is a sequence processing stage or a batch processing stage;
- inputting, when the production stage is a batch processing stage, the static characteristics and dynamic characteristics of each of jobs and the system dynamic characteristics into the job batching submodel to obtain multiple batches divided for the jobs; inputting the static characteristics and dynamic characteristics of each batch of jobs and the system dynamic characteristics into a first sequence determining submodel to obtain a batch execution sequence of multiple batches in the production stage; for each batch, calculating, according to the dynamic characteristics of multiple jobs of the batch and the batch execution sequence, start execution moment and completion execution moment of the jobs of the batch in the production stage, and updating the dynamic characteristics of the jobs of the batch and the system dynamic characteristics;
- inputting, when the production stage is a sequence processing stage, the static characteristics and dynamic characteristics of each of jobs and the system dynamic characteristics into the first sequence determining submodel to obtain a job execution sequence of the jobs in the production stage; for each of jobs, calculating, according to the dynamic characteristics of the job and the job execution sequence, start execution moment and completion execution moment of the job in the production stage, and updating the dynamic characteristics of the job and the system dynamic characteristics.

Optionally, the apparatus further includes a first training module 503, the first training module 503 is configured for performing the following steps:
- step 1, inputting the static characteristics and dynamic characteristics of multiple sample jobs and the system dynamic characteristics into a first actor network to obtain the job execution sequence or batch execution sequence of the multiple sample jobs in each production stage;
- step 2, obtaining, on the basis of the dynamic characteristics of the multiple sample jobs, maximum completion time among completion time corresponding to the multiple sample jobs, and calculating a first cumulative return based on the maximum completion time;
- step 3, inputting the static characteristics and dynamic characteristics of the multiple sample jobs, the first cumulative return, and the system dynamic characteristics into a first critic network, to obtain a first return difference value;
- step 4, using the first return difference value to adjust network parameters of the first actor network and the first critic network;
- step 5, returning, if a current training period is not the last training period, to the step 1; wherein, steps 1 to 4 are a training period;
- step 6, using, if the current training period is the last training period, the first actor network obtained by the current training as the scheduling model.

Optionally, the job batching submodel includes a second sequence determining submodel; the sequence obtaining model 502 is specifically configured for performing the following steps through the job batch submodel:
- performing initialization processing on the static characteristics of each of jobs;
- selecting, based on the static characteristics and dynamic characteristics of each of jobs and the system dynamic characteristics, one job through the second sequence determining submodel, and determining a batch to which the selected job belongs, until batches to which multiple jobs belong is determined and completed.

Optionally, the apparatus further includes a second training module 504, the second training module 504 is configured for performing the following steps:
- step 1, inputting the static characteristics and dynamic characteristics of multiple sample jobs and the system dynamic characteristics into a second actor network to obtain multiple batches divided for multiple samples;
- step 2: for each batch, calculating a difference value of the batch based on the difference value between the processing time of jobs in the batch and the difference value between the completion execution moment of each of jobs in the batch in the previous production stage;

step 3, calculating, according to the difference values of multiple batches, a second cumulative return; inputting the static characteristics and dynamic characteristics of the multiple sample jobs, the second cumulative return, and the system dynamic characteristics into a second critic network, to obtain a second return difference value;

step 4, using the second return difference value to adjust network parameters of the second actor network and the second critic network;

step 5, returning, if a current training period is not the last training period, to the execution of the step 1; wherein, steps 1 to 4 are a training period;

step 6, using, if the current training period is the last training period, the second actor network obtained by the current training as the job batch submodel.

Optionally, the apparatus further includes: a calculating module 505, which is configured for:

calculating a total deviation degree between an initial scheduling scheme and a rescheduling scheme by the following formula, each scheduling scheme includes a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the difference between the start execution moment of the same job in the initial scheduling scheme and the rescheduling scheme in each production stage, LED represents a sum of the difference between a total duration of the execution of the job in the initial scheduling scheme and the rescheduling scheme in the same stage, MED represents whether the same job in the initial scheduling scheme and the rescheduling scheme is executed on the same device in the same production stage, and CED represents the a difference value between the overall processing time duration of the job of the initial scheduling scheme and the rescheduling scheme.

Figure 6:
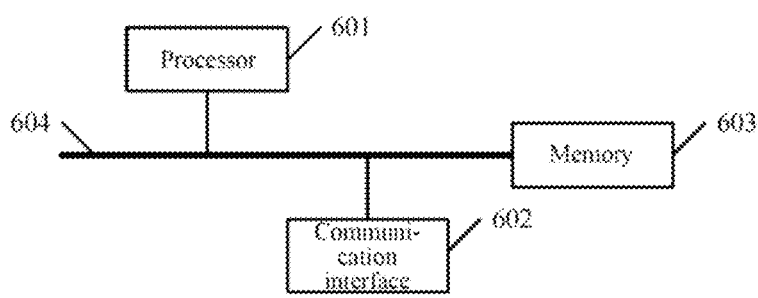
FIG. 6 is a schematic structural diagram of an electronic device according to an embodiment of the present application.

An embodiment of the present invention also provides an electronic device as shown in FIG. 6, comprising a processor 601, a communications interface 602, a memory 603 and a communication bus 604, wherein the processor 601, the communications interface 602, and the memory 603 communicate with each other via the communication bus 604, the memory 603 is used for storing computer program;

the processor 601 is used for performing the steps of the method in the above-mentioned embodiment when executing the program stored on the memory 603.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.

the communications interface is used for communication between the aforementioned electronic device and other devices.

The memory can include a random access memory (RAM), or can include a non-volatile memory (NVM), for example at least one disk memory. Optionally, the memory can also be at least one storage device located away from the processor described above.

The aforementioned processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

In another embodiment of the present application, it is also provided a computer-readable storage medium, having computer programs stored thereon which, when executed by a processing machine, cause the processing machine to implement the steps of any one of the above dynamic production scheduling method based on deep reinforcement learning.

In yet another embodiment of the present application, it is also provided a computer program product containing instructions, which when run on a computer, causes the computer to implement the steps of any one of the above dynamic production scheduling method based on deep reinforcement learning in the above embodiments.

In the aforementioned embodiments, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the embodiments of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a device, since they are similar to embodiments of a method, the description thereof is relatively simple; the relating parts could refer to the parts of the description of embodiments of the method.

Embodiments described above are just preferred embodiments of the disclosure, and not intended to limit the scope of the disclosure. Any modifications, equivalent, improvement or the like within the spirit and principle of the disclosure should be included in the scope of the disclosure.

What is claimed is:

1. A dynamic production scheduling method based on deep reinforcement learning, wherein the method comprises:
   acquiring static characteristics and dynamic characteristics of each of jobs to be scheduled and system dynamic characteristics, the static characteristics of the job comprise an amount of tasks and time required for completion, the dynamic characteristics of the job comprise reception moment, and the system dynamic characteristics comprise a remaining amount of tasks that can be performed by a device in each production stage;
   inputting the static characteristics, dynamic characteristics of each of jobs and the system dynamic characteristics into a scheduling model to obtain a job execution sequence or batch execution sequence of the jobs in each production stage output by the scheduling model; each batch comprises multiple jobs;
   wherein the scheduling model is: a model obtained after training a first actor network based on static characteristics and dynamic characteristics of multiple sample jobs, system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

2. The method of claim 1, wherein the scheduling model comprises a job batching submodel and a first sequence determining submodel; the scheduling model determines a job execution sequence or batch execution sequence of the jobs in each production stage through the following steps:
   determining, according to the sequence of each production stage and starting from the first production stage, whether the production stage is a sequence processing stage or a batch processing stage;
   inputting, when the production stage is a batch processing stage, the static characteristics and dynamic characteristics of each of jobs and the system dynamic characteristics into the job batching submodel to obtain multiple batches divided for the jobs; inputting the static characteristics and dynamic characteristics of multiple batches of jobs and the system dynamic characteristics into a first sequence determining submodel to obtain a batch execution sequence of multiple batches in the production stage; for each batch, calculating, according to the dynamic characteristics of multiple jobs of the batch and the batch execution sequence, start execution moment and completion execution moment of the jobs of the batch in the production stage, and updating the dynamic characteristics of the jobs of the batch and the system dynamic characteristics;
   inputting, when the production stage is a sequence processing stage, the static characteristics and dynamic characteristics of each of jobs and the system dynamic characteristics into the first sequence determining submodel to obtain a job execution sequence of the jobs in the production stage; for each of jobs, calculating, according to the dynamic characteristics of the job and the job execution sequence, start execution moment and completion execution moment of the job in the production stage, and updating the dynamic characteristics of the job and the system dynamic characteristics.

3. The method of claim 2, wherein the scheduling model is obtained through training in the following steps:
   step 1, inputting the static characteristics and dynamic characteristics of multiple sample jobs and the system dynamic characteristics into a first actor network to obtain the job execution sequence or batch execution sequence of the multiple sample jobs in each production stage;
   step 2, obtaining, on the basis of the dynamic characteristics of the multiple sample jobs, maximum completion time among completion time corresponding to the multiple sample jobs, and calculating a first cumulative return based on the maximum completion time;
   step 3, inputting the static characteristics and dynamic characteristics of the multiple sample jobs, the first cumulative return, and the system dynamic characteristics into a first critic network, to obtain a first return difference value;
   step 4, using the first return difference value to adjust network parameters of the first actor network and the first critic network;
   step 5, returning, if a current training period is not the last training period, to the execution of the step 1; wherein, steps 1 to 4 are a training period;
   step 6, using, if the current training period is the last training period, the first actor network obtained by the current training as the scheduling model.

4. The method of claim 2, wherein the job batching submodel comprises a second sequence determining submodel; the job batching submodel divides multiple jobs into batches through the following steps:
   performing initialization processing on the static characteristics of each of jobs;
   selecting, based on the static characteristics and dynamic characteristics of each of jobs and the system dynamic characteristics, one job through the second sequence determining submodel, and determining a batch to which the selected job belongs, until batches to which multiple jobs belong is determined and completed.

5. The method of claim 4, wherein the job batching submodel is obtained through training in the following steps:
   step 1, inputting the static characteristics and dynamic characteristics of multiple sample jobs and the system dynamic characteristics into a second actor network to obtain multiple batches divided for multiple samples;
   step 2: for each batch, calculating a difference value of the batch based on the difference value between the processing time of jobs in the batch and the difference value between the completion execution moment of jobs in the batch in the previous production stage;
   step 3, calculating, according to the difference values of multiple batches, a second cumulative return; inputting the static characteristics and dynamic characteristics of the multiple sample jobs, the second cumulative return, and the system dynamic characteristics into a second critic network, to obtain a second return difference value;

step 4, using the second return difference value to adjust network parameters of the second actor network and the second critic network;

step 5, returning, if a current training period is not the last training period, to the execution of the step 1; wherein, steps 1 to 4 are a training period;

step 6, using, if the current training period is the last training period, the second actor network obtained by the current training as the job batch submodel.

6. The method of claim 1, further comprising:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

7. The method of claim 2, further comprising:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

8. The method of claim 3, further comprising:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

9. The method of claim 4, further comprising:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

10. The method of claim 5, further comprising:

calculating a total deviation degree between an initial scheduling scheme and a rescheduling scheme by the following formula, each scheduling scheme comprises a job execution sequence or a batch execution sequence of jobs in each production stage;

$$DE=\omega_p PED+\omega_l LED+\omega_m MED+\omega_c CED$$

wherein, DE is the total deviation degree, and $\omega_p$, $\omega_l$, $\omega_m$, and $\omega_c$ are preset weighting coefficients, and $\omega_p+\omega_l+\omega_m+\omega_c=1$, PED represents a sum of the differences for the jobs which each is a difference between the start execution moment of a job in the initial scheduling scheme and the start execution moment of the same job in the rescheduling scheme in each production stage, LED represents a sum of the differences for stages which each is a difference between a total duration of the execution of the jobs in the initial scheduling scheme and a total duration of the execution of the jobs in the rescheduling scheme in a same stage, MED represents whether the same job in the initial scheduling scheme and the rescheduling scheme is executed on the same device in the same production stage, and CED represents a difference value between the overall processing time duration of the jobs of the initial scheduling scheme and the rescheduling scheme.

11. A dynamic production scheduling apparatus based on deep reinforcement learning, wherein the apparatus comprises:
a feature acquiring module, configure for acquiring static characteristics and dynamic characteristics of each of jobs to be scheduled and system dynamic characteristics, the static characteristics of the job comprise an amount of tasks and time required for completion, the dynamic characteristics of the job comprise reception moment, and the system dynamic characteristics comprise a remaining amount of tasks that can be performed by a device in each production stage;
a sequence obtaining module, configured for inputting the static characteristics, dynamic characteristics of each of jobs and the system dynamic characteristics into a scheduling model, to obtain a job execution sequence or batch execution sequence of the jobs in each production stage output by the scheduling model; each batch comprises multiple jobs;
wherein the scheduling model is: a model obtained after training a first actor network based on the static characteristics and dynamic characteristics of multiple sample jobs, system dynamic characteristics and a first critic network, the first critic network is used to evaluate output results of the first actor network based on completion time corresponding to each sample job, wherein the completion time corresponding to each sample job is a time difference between start execution moment of the sample job in a first production stage and completion execution moment of the sample job in a last production stage.

12. The apparatus of claim 11, wherein the scheduling model comprises a job batching submodel and a first sequence determining submodel; the sequence obtaining model is specifically configured for performing the following steps through the scheduling model:
determining, according to the sequence of each production stage and starting from the first production stage, whether the production stage is a sequence processing stage or a batch processing stage;
inputting, when the production stage is a batch processing stage, the static characteristics and dynamic characteristics of each of jobs and the system dynamic characteristics into the job batching submodel to obtain multiple batches divided for the jobs; inputting the static characteristics and dynamic characteristics of multiple batches of jobs and the system dynamic characteristics into a first sequence determining submodel to obtain a batch execution sequence of multiple batches in the production stage; for each batch, calculating, according to the dynamic characteristics of multiple jobs of the batch and the batch execution sequence, start execution moment and completion execution moment of the jobs of the batch in the production stage, and updating the dynamic characteristics of the jobs of the batch and the system dynamic characteristics;
inputting, when the production stage is a sequence processing stage, the static characteristics and dynamic characteristics of each of jobs and the system dynamic characteristics into the first sequence determining submodel to obtain a job execution sequence of the jobs in the production stage; for each of jobs, calculating, according to the dynamic characteristics of the job and the job execution sequence, start execution moment and completion execution moment of the job in the production stage, and updating the dynamic characteristics of the job and the system dynamic characteristics.

13. The apparatus of claim 12, wherein the apparatus further comprises a first training module, the first training module is configured for performing the following steps:
step 1, inputting the static characteristics and dynamic characteristics of multiple sample jobs and the system dynamic characteristics into a first actor network to obtain the job execution sequence or batch execution sequence of the multiple sample jobs in each production stage;
step 2, obtaining, on the basis of the dynamic characteristics of the multiple sample jobs, maximum completion time among completion time corresponding to the multiple sample jobs, and calculating a first cumulative return based on the maximum completion time;
step 3, inputting the static characteristics and dynamic characteristics of the multiple sample jobs, the first cumulative return, and the system dynamic characteristics into a first critic network, to obtain a first return difference value;
step 4, using the first return difference value to adjust network parameters of the first actor network and the first critic network;
step 5, returning, if a current training period is not the last training period, to the execution of the step 1; wherein, steps 1 to 4 are a training period;
step 6, using, if the current training period is the last training period, the first actor network obtained by the current training as the scheduling model.

14. An electronic device wherein it comprises a processor, communication interfaces, a memory and a communication bus, wherein the processor, the communication interfaces and the memory communicate with each other via the communication bus;
the memory is configured for storing a computer program;
the processor is configured for implementing steps of the method of claim 1 when executing the program stored on the memory.

* * * * *